Nov. 4, 1924.
C. S. HULETT
1,514,527
DISPLAY DEVICE
Filed July 30, 1921    2 Sheets-Sheet 1
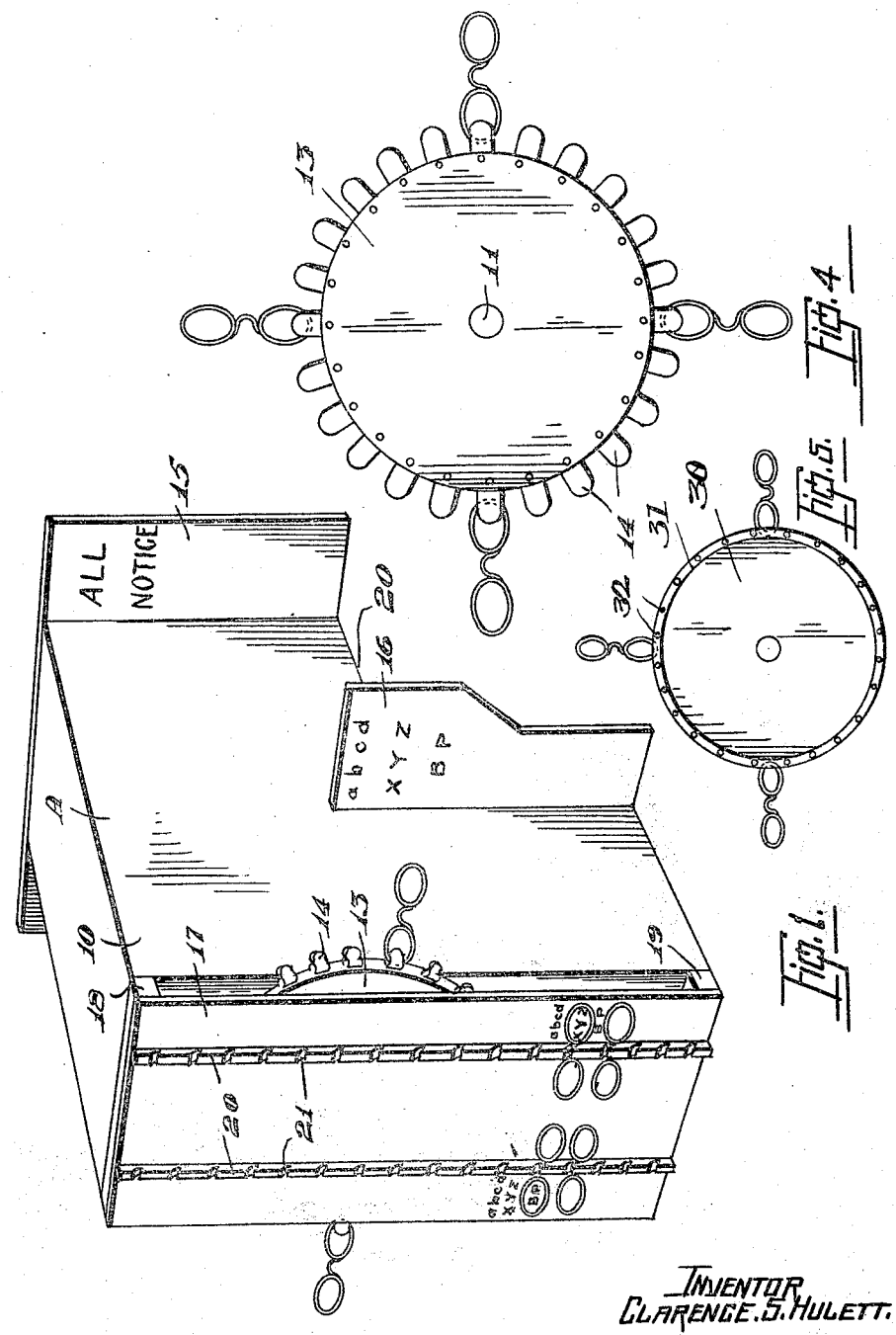
INVENTOR
CLARENCE S. HULETT.
BY
ATTYS.

Nov. 4, 1924.
C. S. HULETT
1,514,527
DISPLAY DEVICE
Filed July 30, 1921        2 Sheets-Sheet 2
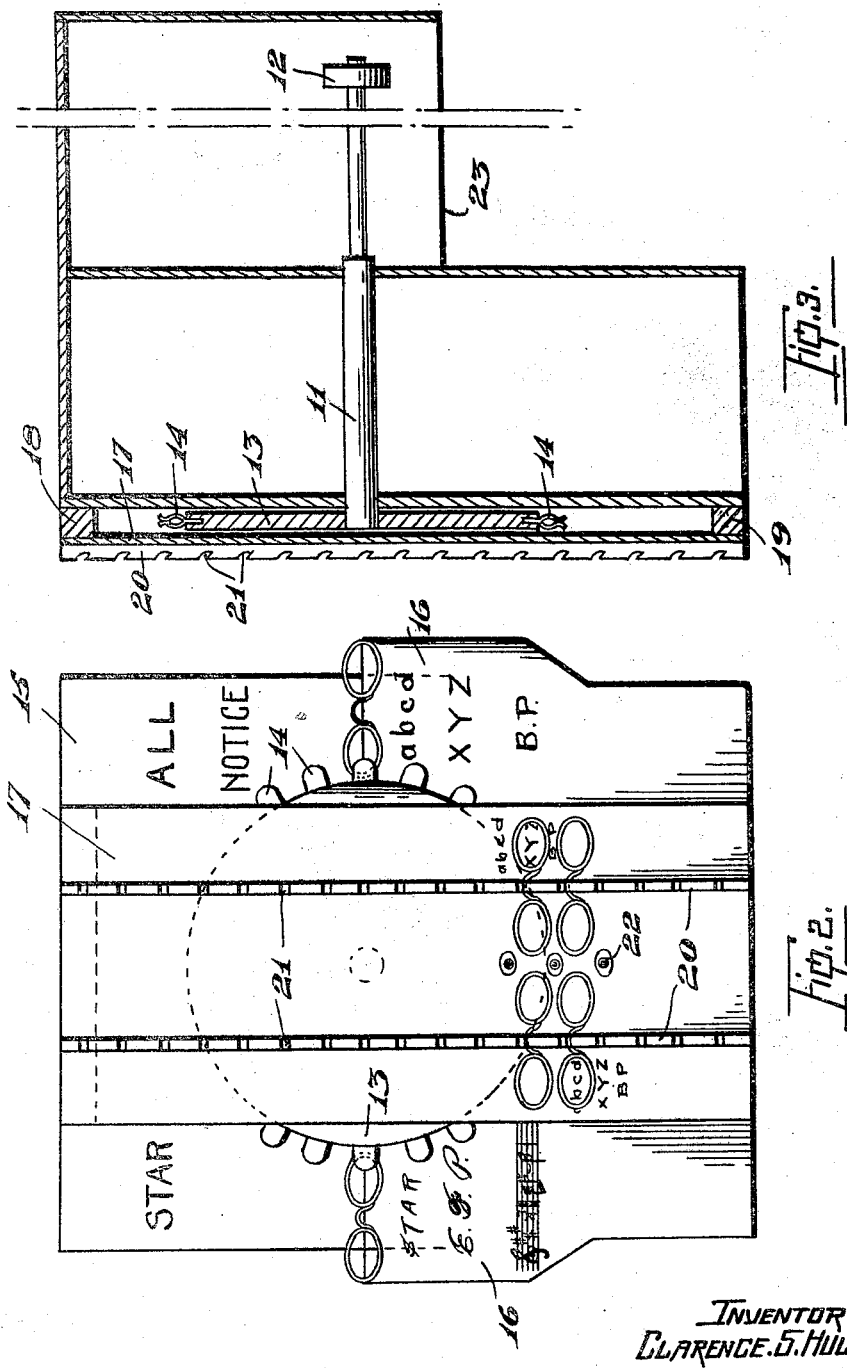

Patented Nov. 4, 1924.

1,514,527

UNITED STATES PATENT OFFICE.

CLARENCE STEPHEN HULETT, OF EDMONTON, ALBERTA, CANADA.

DISPLAY DEVICE.

Application filed July 30, 1921. Serial No. 488,651.

*To all whom it may concern:*

Be it known that I, CLARENCE STEPHEN HULETT, a subject of the King of Great Britain, and resident of the city of Edmonton, in the Province of Alberta, Dominion of Canada, have invented certain new and useful Improvements in Display Devices, of which the following is a specification.

This invention relates to a display device especially for those adapted to display glasses, spectacles and glass eyes, and generally the class of goods kept in stock by an optician.

Further objects are to provide a case wherein the glasses will be adapted to be rotated in front of spaced wings on which letters of different sizes will be imprinted, to provide a means to carry several glasses around the periphery of a rotatable disc.

These objects are attained by means of a display device having a rotatable disc provided on its periphery with a plurality of resilient clips designed to engage the rims of glasses which are thus caused to rotate in front of different sized letters.

Further objects are to provide a display device that is simple in construction and not liable to get out of repair, and generally to adapt the several parts to better perform the functions required of them.

With the above and other objects in view, the invention consists essentially of the improved construction hereinafter described in detail in the accompanying specification and drawings.

In the drawings:—

Figure 1 is a perspective view of my improved display case.

Figure 2 is a front elevation of the same.

Figure 3 is a vertical section.

Figure 4 is a front elevation of the rotatable disc. Figure 5 is a plan of an alternative form.

In the drawings, like characters of reference indicate corresponding parts in the several figures.

Referring to the drawings, A represents the improved display device comprising a boxing 10 of any suitable form and provided with a horizontal shaft 11 extending therein from front to back and carrying a pulley 12 which may be connected to any suitable source of power.

The opposite end of the shaft 11 carries a disc 13. The periphery thereof is provided with a plurality of resilient clips 14 or other suitable means designed to engage the rim of several eye glasses placed around the periphery of the disc for exhibiting purposes.

The sides of the boxing 10 are provided with laterally extending wings 15 and 16, the wings 16 being spaced from the wings 15 and in closer proximity to the glasses carried by the disc 13.

On the wings 15 and 16 are imprinted letters and characters of all sizes so that when the disc is rotated and the glasses carried thereby pass successively in front of the several wings, the spectators will be able to see the special character of letters they distinguish best with a special mark of glasses.

In front of the disc 13 is located a board 17 spaced from the front of the boxing 10 by means of the members 18 and 19 so as to allow room for the disc 13. The board 17 is provided with two or more upright rods 20 formed with notches 21 designed to engage glasses and spectacles as shown in the drawings.

It will be seen that when this display device is in use and glasses of different strengths and tints are engaged in the resilient clips 14 on the disc 13 then the same are rotated in front of the wings 15 and 16, the glasses will pass successively in front of all sizes of letters whereby the spectators will notice that they see a special character of letter much better with a certain mark of glasses.

Glass eyes 22 may also be carried by the front board 17 as shown in Figure 2 of the drawings. The disc 13 may be rotated through any suitable source of power through the pulley 13, such as a small electric motor which may be located behind the casing in a recess 23 especially adapted for the purpose.

As many changes could be made in the above construction, and many apparently widely different embodiments of my invention, within the scope of the claim, constructed without departing from the spirit or scope thereof, it is intended that all matter contained in the accompanying specification and drawings shall be interpreted as illustrative and not in a limiting sense.

In the alternative form of the invention shown in Figure 5, the disc 30 is provided around the periphery with a tape 31 secured at intervals by studs 32 thus forming pockets in which the spectacles are designed to be held.

What I claim as my invention is:

A display device comprising a boxing, wings extending on the sides thereof in parallel and staggered relation to each other, letters of different sizes being imprinted on the wings, a shaft in the boxing extending in front thereof, a disc in front of the casing keyed to the shaft, resilient clips on the periphery of the disc designed to engage glasses, a board spaced from the boxing mounted in front of the disc, writing of different sizes on the board, means on the board to retain glasses in front of the writing, and means connected to the shaft to rotate the disc so as to cause the glasses to successively pass in front of the several spaced wings.

In witness whereof I have hereunto set my hand in the presence of two witnesses.

CLARENCE STEPHEN HULETT.

Witnesses:
   GLADYS G. CUFF,
   R. H. GUNN.